United States Patent
Fahrngruber et al.

(10) Patent No.: US 11,168,203 B2
(45) Date of Patent: Nov. 9, 2021

(54) THERMOPLASTIC STARCH

(71) Applicant: AGRANA BETEILIGUNGS-AKTIENGESELLSCHAFT, Vienna (AT)

(72) Inventors: Barbara Fahrngruber, Tulln (AT); Marnik Michel Wastyn, Tulln (AT); Martin Kozich, Tulln (AT)

(73) Assignee: AGRANA BETEILIGUNGS-AKTIENGESELLSCHAFT, Vienna (AT)

( * ) Notice: Subject to any disclaimer, the term of this patent is extended or adjusted under 35 U.S.C. 154(b) by 0 days.

(21) Appl. No.: 16/961,480

(22) PCT Filed: Jan. 11, 2019

(86) PCT No.: PCT/EP2019/050604
§ 371 (c)(1),
(2) Date: Jul. 10, 2020

(87) PCT Pub. No.: WO2019/138022
PCT Pub. Date: Jul. 18, 2019

(65) Prior Publication Data
US 2020/0377694 A1    Dec. 3, 2020

(30) Foreign Application Priority Data
Jan. 11, 2018  (EP) .................................. 18151223

(51) Int. Cl.
| | |
|---|---|
| *C08B 37/02* | (2006.01) |
| *C08L 3/02* | (2006.01) |
| *B29C 48/00* | (2019.01) |
| *B29C 48/08* | (2019.01) |
| *B29C 48/40* | (2019.01) |
| *C08K 5/053* | (2006.01) |
| *C08K 5/092* | (2006.01) |
| *B29K 67/00* | (2006.01) |
| *B29K 75/00* | (2006.01) |
| *B29K 77/00* | (2006.01) |

(52) U.S. Cl.
CPC .............. *C08L 3/02* (2013.01); *B29C 48/022* (2019.02); *B29C 48/08* (2019.02); *B29C 48/40* (2019.02); *C08K 5/053* (2013.01); *C08K 5/092* (2013.01); *B29K 2003/00* (2013.01); *B29K 2067/00* (2013.01); *B29K 2075/00* (2013.01); *B29K 2077/00* (2013.01)

(58) Field of Classification Search
CPC .......... C08L 3/02; C08K 5/058; C08K 5/092; B29C 48/08; B29K 2003/00
USPC ......................................................... 536/102
See application file for complete search history.

(56) References Cited

U.S. PATENT DOCUMENTS

| | | | |
|---|---|---|---|
| 9,045,625 B2 | 6/2015 | Huneault et al. | |
| 2014/0272370 A1* | 9/2014 | Broyles ................ | C08K 5/0016 428/220 |

FOREIGN PATENT DOCUMENTS

| | | | | |
|---|---|---|---|---|
| DE | 19822979 A1 * | 12/1999 | ................ | C08L 3/00 |
| DE | 102007050770 A1 | 4/2009 | | |
| WO | 2006042364 A1 | 4/2006 | | |
| WO | WO 2006/042364 A1 * | 4/2006 | ................ | C08L 3/00 |
| WO | 2012162092 A1 | 11/2012 | | |

OTHER PUBLICATIONS

Ma et al, Carbohydrate Polymers, 2009, 75, 1-8.*
International Search Report (English Version) PCT/EP2019/050604, European Patent Office.
English Translation of DE19822979 A1, Google Patents.
English Translation of DE 102007050770 A1, Google Patents.

* cited by examiner

*Primary Examiner* — Ganapathy Krishnan
(74) *Attorney, Agent, or Firm* — Fasken Martineau DuMoulin S.E.N.C.R.L., s.r.l.

(57) ABSTRACT

The invention relates to a method for producing thermoplastic starch, in which a mixture comprising starch and a polyol, preferably selected from the group comprising polyethylene glycol, monosaccharides, sugar alcohols such as glycerol, sorbitol, erythritol, xylitol or mannitol and mixtures thereof, in a quantity of between 10 and 25 wt. % of the mixture, and an epoxide selected from the group comprising epoxidised plant oils such as soybean oil, linseed oil, sunflower oil, rapeseed oil and mixtures thereof, in a quantity of between 0.1 and 6, preferably between 2.5 and 3.5 wt. % of the mixture, is extruded, the mixture also containing an acid, preferably a carboxylic acid selected from the group consisting of citric acid, malic acid or tartaric acid, in a quantity of between 0 and 1, preferably between 0.1 and 0.5 wt. % of the mixture. The invention also relates to such a produced thermoplastic starch, to a compound produced by means of the thermoplastic starch, and to a film produced from such a compound.

17 Claims, 2 Drawing Sheets

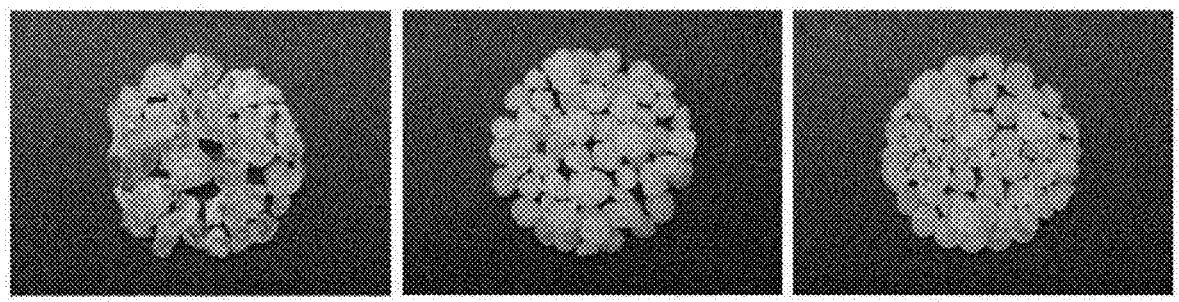
Figure 1: TPS with addition of acid and a) 0 %, b) 2 %, c) 4 % modified oil component
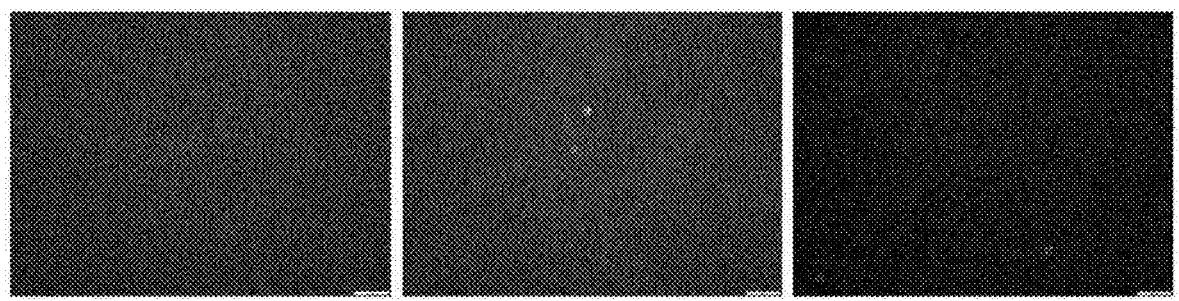
Figure 2: Polarisation for 3, 5 and 6 % ELO - magnified 100 times
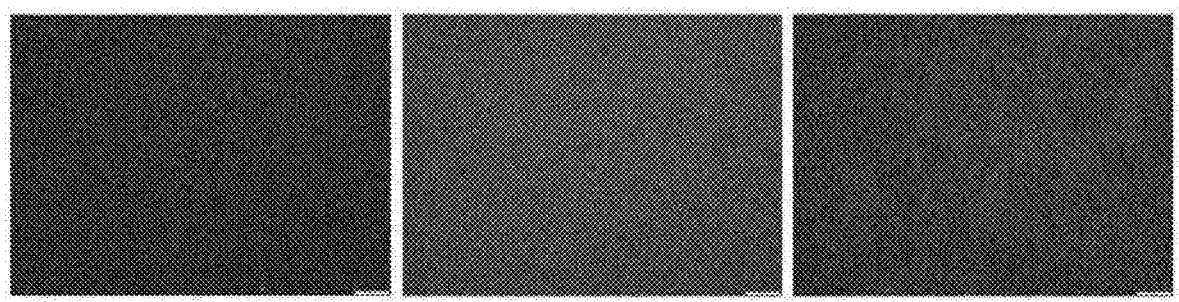
Figure 3: Polarisation for 3, 5 and 6 % ESBO - magnified 100 times
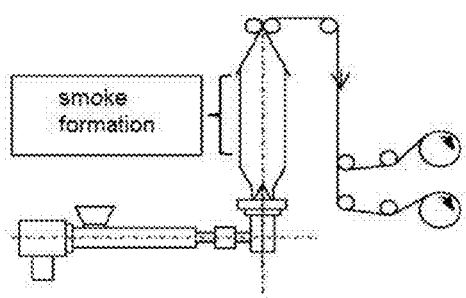
Figure 4: Smoking behaviour of the films

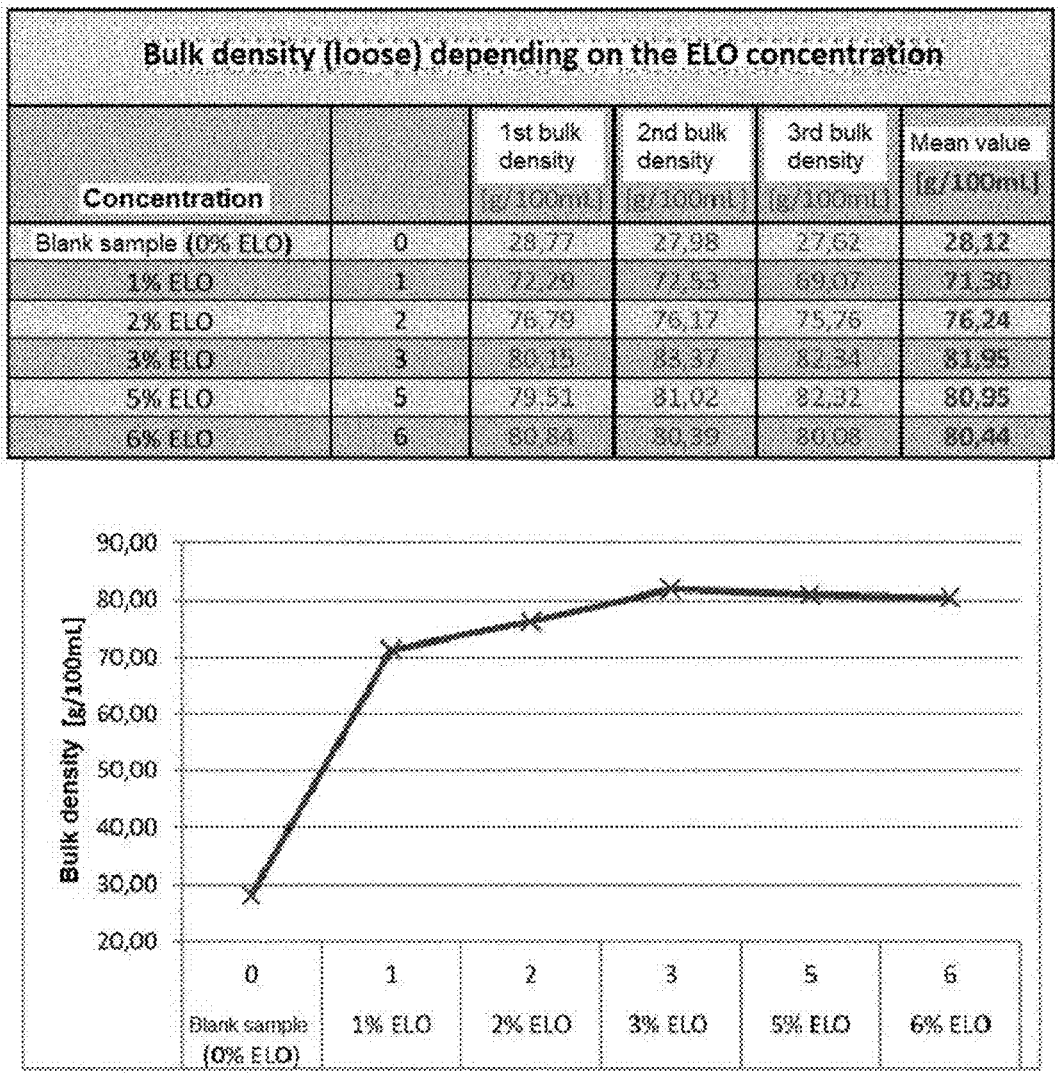
Figure 5: Bulk density of the TPS according to the invention depending on the amount of ELO

THERMOPLASTIC STARCH

CROSS-REFERENCE

The present application is the United States National Stage of International Application No. PCT/EP2019/050604, filed Jan. 11, 2019, entitled "Thermoplastic Starch". Through the '604 International Application, the present application claims priority to European Patent Application 18151223.7, filed Jan. 11, 2018.

FIELD

The present invention relates to a method for producing thermoplastic starch, a thermoplastic starch produced in this way, a compound containing the thermoplastic starch, and a film produced from such a compound.

BACKGROUND

According to the definition of Carvalho, thermoplastic starch (hereinafter also referred to as TPS) is an amorphous or semi-crystalline material consisting of broken-down or destructured starch and one or more plasticisers. TPS may be repeatedly converted into the plastic state and re-hardened, enabling it to be shaped under the action of heat and shear stress, which allows it to be processed using plastics industry techniques. TPS as a material usually has a hydrophilic character, which means that the material properties are strongly dependent on the climatic environmental conditions. For this reason, TPS is rarely used directly or solely for producing bioplastics. The use of finely distributed TPS (disperse phase) in a polymer matrix (continuous phase), on the other hand, offers the possibility of a) considerably increasing the bio-based portion in plastics formulations and b) integrating a biodegradable component, depending on the choice of matrix polymer. Materials which are required to be completely biodegradable or compostable (for example according to standard EN 13432), require the use of a polymer matrix which may be decomposed in a biological medium and under the action of water by the influence of microorganisms.

Thermoplastic polymers may be melted repeatedly by increasing the temperature. After cooling, they are present in a predominantly crystalline or amorphous structure. This property is used for the purpose of shaping and functions due to the fact that the glass transition temperature (Tg) of thermoplastics is below room temperature. Native starch does not demonstrate this behaviour. When processed into a thermoplastic material, the originally semi-crystalline, granular structure is broken up to create a continuous amorphous phase, thus making starch accessible for shaping by conventional plastics processing methods. When heated above the gelatinisation temperature, starch begins to swell in the presence of water. During this process, liquid diffuses into the interior of the grains and ultimately interacts with the free hydroxy groups of the starch molecules. This breaks the hydrogen bonds, the material loses crystallinity, and lastly amorphous areas start to dissolve. The process is fundamentally determined by the temperature curve. Up to a threshold value of approximately 50° C. the procedure is reversible. Further heating causes irreversibly strong swelling. The loss of crystallinity causes the starch grains to lose their onion-skin structure and the birefringence visible under microscope, and the viscosity of the suspension increases rapidly. In an extrusion process, plasticisers are also added in addition to water to achieve the breakdown of the starch under these water-limited conditions. By using plasticisers such as glycerol, sorbitol, erythritol, polyethylene glycol, various mono- and disaccharides or sugar alcohols, intermolecular interactions are reduced, similarly to the effect of water, by breaking the hydrogen bonds between the starch molecules. The procedure in the extruder is accompanied by a splitting of the polymer chains and thus a partial depolymerisation, which causes both the melting and the glass transition temperature to drop below the degradation temperature (230° C.).

U.S. Pat. No. 5,362,777 discloses the production of thermoplastic starch (TPS) with the addition of plasticisers, for example sorbitol; plant fats may also be added to improve the flow properties.

WO 99/61524 relates to a film made from a thermoplastic polymer mixture containing TPS, at least one polyester urethane, a plasticiser such as sorbitol, and oils containing epoxide groups as lubricants, in particular epoxidised linseed oil.

DE 198 24 968 A1 also discloses a film made from a thermoplastic polymer mixture containing TPS with a polymer obtainable by polycondensation or polyaddition, containing plasticisers, for example sorbitol, and plant fats or oils as lubricants.

According to WO 2012/162085 A1, TPS, oil and/or wax (epoxidised plant oil or linseed oil) are disclosed. TPS is a starting product; the presence of another thermoplastic polymer is absolutely necessary for the processing of thermoplastic starch.

Lastly, WO 2006/042364 A1 discloses a mixture of sorbitol and other plasticisers, for example epoxidised linseed oil. Starch is a starting product. Apart from starch, a water-soluble polymer is also present, for example polyvinyl alcohol, polyvinyl acetate or copolymers of ethylene and vinyl alcohol.

The TPS already known from the above-mentioned prior art, despite the addition of plasticisers, is inherently brittle and hydrophilic. Thus, when using pure TPS, the high demands (strength, water resistance) placed on technical products in film extrusion cannot be met. In particular, it is difficult to stand up to a comparison with synthetic polymer systems in terms of processability and end product properties (extensibility, tensile strength). Furthermore, it has been shown that if the approach of compound production based on glycerol-plasticised, non-reactively functionalised TPS is followed, fundamental problems arise during the course of technical implementation.

Due to large differences in viscosity, a fine dispersion of TPS in a polymer matrix is only efficient under high shear (the TPS has a very high viscosity, whereas the polymer tends to have a low viscosity). This may lead to mechanical damage of the TPS phase and an associated brown colouring of the compound material. In addition, the high viscosity of the untreated TPS makes processing more difficult, which is reflected in increased torque and pressure conditions in the extruder.

In addition, the compatibility at the interfaces between the hydrophilic TPS and the hydrophobic polymer is limited, which leads to an impairment of the mechanical material properties (tensile strength, extensibility) in the end product Furthermore, in both flat and blown film processing, smoke or glycerine vapours are generated from a processing temperature of approximately 150° C. Depending on the TPS content added, the temperature must generally be raised to at least 150° C. to give the TPS polymer melt an appropriate flowability. This leads to a loss of plasticisers in the material (and thus to a deterioration in quality), as well as to the undesired formation of condensate on the plant cooling units.

Due to the water bound in the starch, there is also a process-dependent, more or less strong expansion of the polymer melt at the die outlet (formation of bubbles on the surface due to the escape of water vapour). The exclusive substitution of glycerol by plasticisers (polyols) of higher molar mass, such as sorbitol, isosorbide or xylitol in the TPS has been proven to lead to a deterioration of the achievable mechanical properties (extensibility and/or tensile strength, tear resistance) in the case of film materials based on TPS and polymer.

Due to a lack of compatibility, the TPS qualities currently available on the market do not usually allow for use in a proportion of over 30-40 wt. % in the compound or film, without the mechanical properties of the end products (films) suffering greatly. However, it would be desirable to produce films with a higher proportion (>40 wt. %) of renewable raw materials such as TPS.

DE 198 22 979 A1 discloses films produced by extruding a mixture containing thermoplastic starch and/or a thermoplastic starch derivative, at least one polyester urethane, glycerol and epoxidised linseed oil. Acids are mentioned in a combination of TPS with a polyurethane as crosslinking agent.

WO 2012/162092 A1 discloses the production of thermoplastic starch by extruding a mixture containing starch, polyol and epoxidised plant oil.

SUMMARY

The object of the present invention is to overcome the above-mentioned disadvantages of the prior art and to provide a TPS free from polyester urethane which is suitable for producing compounds with at least one thermoplastic polymer which may be used as a compound for producing films by means of blown film or flat film extrusion.

This object is achieved in accordance with the invention by a method for producing thermoplastic starch, in which method a mixture comprising starch and a polyol, preferably selected from the group comprising polyethylene glycol, mono- and disaccharides, sugar alcohols such as glycerol, sorbitol, erythritol, xylitol or mannitol and mixtures thereof, in a quantity of between 10 and 25 wt. % of the mixture, and an epoxide selected from the group comprising epoxidised plant oils such as soybean oil, linseed oil, sunflower oil, rapeseed oil and mixtures thereof, in a quantity of between 0.1 and 6, preferably between 1 and 4.5, particularly preferably between 2.5 and 3.5 wt. of the mixture, is extruded, the mixture also containing an acid, preferably a carboxylic acid selected from the group consisting of citric acid, malic acid or tartaric acid, in a quantity of between 0.1 and 1, preferably between 0.1 and 0.5 wt. % of the mixture and being free of polyester urethane. The invention is a formulation for producing thermoplastic starch (TPS) with an optimised property profile from the point of view of both processing and material properties. The starting materials used are starch, a plasticiser (10-25 wt. %), an acid (0.1-1 wt. %) and an epoxidised plant oil (0.1-6.0 wt. %). The end product is cold water swelling to cold water soluble. For producing thin-walled film materials (in the range of, for example, 10-50 μM thickness) it is important to distribute the TPS as finely as possible in the compound matrix. The acid used in the extrusion of starch together with a polyol and an epoxide in accordance with the invention acts both as an activating agent for the epoxide and as a processing aid, since it a) cuts the branch chains on amylopectin and thus increases the proportion of linear molecules. The behaviour of the polymer thus becomes similar to that of classic thermoplastic materials. b) Furthermore, during the course of the addition of the acid, a depolymerisation of the molecules at the glycosidic bond takes place. The effect of change in process conditions such as temperature, pressure and residence time may thus be better estimated. Carboxylic acids such as citric acid, malic acid, acetic acid or tartaric acid have proven to be effective for this purpose. With regard to the quantities mentioned, it must be said that ranges of less than 0.1 wt. % are hardly feasible in industrial practice, above approximately 1 wt. % (depending on the acid used) there is a drastic reduction of the molecular mass and associated deteriorations of properties, strong foaming of the melt which makes granulation no longer possible, and strong dust formation due to TPS abrasion. Surprisingly, it has also been found that a TPS particle size of <5 μm in the polymer matrix may be achieved with the thermoplastic starch produced in accordance with the invention in order to avoid the formation of micro-roughness (film surface) and the occurrence of associated mechanical weak points. The use of this TPS in the form of a finely distributed disperse compound phase in combination with, for example, degradable thermoplastic polyesters (the continuous phase) offers a simple possibility to increase the moisture resistance and to optimise the final product properties. In this way, the biodegradability of the end product may also be adjusted. The sustainable character of the end product may be increased by the elevated content of TPS which is made possible as a result. For the epoxide, it has been found that the absorption capacity of the melt is exhausted at 6.0 wt. %; a higher addition leads to oily deposits on the product and/or equipment.

Preferably, the quantity of starch in the mixture used in accordance with the invention is the remainder to 100 wt. % of the mixture which is missing in addition to the other ingredients present (polyol, epoxide and acid), although other auxiliary substances and additives known to a person skilled in the art may also be present. In any case, the mixture used in accordance with the invention is free of polyester urethane(s).

Starch: The starch used in accordance with the invention may be any conventional tuber, cereal or legume starch, for example pea starch, maize starch incl. waxy maize starch, potato starch incl. waxy potato starch, amaranth starch, rice starch incl. waxy rice starch, wheat starch incl. waxy wheat starch, barley starch incl. waxy barley starch, tapioca starch incl. waxy tapioca starch, and sago starch. Starches of natural origin generally have an amylose content of 20 to 30 wt. %, depending on the plant species from which they are obtained. According to the invention, starches rich in amylopectin, which have a significantly increased amylopectin content, or products containing an increased amylose content, also belong to this category. In addition to the natural starch types rich in amylopectin and high amylose types obtained by breeding measures, also starches rich in amylopectin or high amylose starches obtained by chemical and/or physical fractionation or produced by genetically modified plants may be used. Functionalised starches may also be used and are defined as follows:

Functionalised starch: The starch used in accordance with the invention may also be a functionalised starch; if the term "starch" is used in the present description and in the claims, it is also understood to mean a functionalised starch. For example, etherifications or esterifications also fall under the scope of functionalisation. In the following, some derivatisations are described which, alone or in combination with each other, may be provided for further derivatisation of starch derivatives. The type of derivatisation and the raw material basis of the starch used are very closely related to the specific field of application of the particular product. The methods for this are known per se. In particular, the focus here will be on the functionalisation in slurry, paste, (semi-) dry method and functionalisation by means of reactive extrusion.

In general, starch derivatives are divided into starch ethers and starch esters. Furthermore, it is possible to differentiate between non-ionic, anionic, cationic and amphoteric as well as hydrophobic starch derivatives, which may be produced by slurry, paste, semi-dry or dry derivatisation as well as by derivatisation in organic solvents.

Anionic and non-ionic functionalisation of starch includes those derivatives in which the free hydroxyl groups of starch are substituted by anionic or non-ionic groups. Starch may also be anionically functionalised by oxidative processes such as the treatment of starch with hydrogen peroxide or hypolye or by a laccase/mediator system.

In principle, anionic and non-ionic derivatisation may be carried out in two ways:

a) Functionalisation achieves an esterification of starch. Inorganic or organic acids or salts thereof or esters thereof or anhydrides thereof are used as functionalising agents. Mixed esters or anhydrides may also be used. In the esterification of starch, this may also take place several times, so that, for example, distarch phosphoric acid esters may be produced. Preferably, the starch used in accordance with the invention is the result of an esterification with mono-, di- or tricarboxylic acids with an alkyl chain with 1 to 30 carbon atoms or a carbamate, particularly preferably an acylated, such as a succinylated, octenylsuccinylated, dodecylsuccinylated or acetylated carbamate.

b) During the course of functionalisation, the starch is etherified. Methyl, ethyl, hydroxyethyl, hydroxypropyl, hydroxybutyl, carboxymethyl, cyanoethyl, carbamoylethyl ether starch or mixtures thereof may be used.

Cationic functionalisation of starches includes those derivatives in which a positive charge is introduced into the starch by substitution. The cationisation processes are carried out with amino, imino, ammonium, sulfonium or phosphonium groups. Such cationic derivatives preferably contain nitrogen-containing groups, in particular primary, secondary, tertiary and quaternary amines or sulfonium and phosphonium groups which are bound via ether or ester bonds.

Amphoteric starches represent another group. These contain both anionic and cationic groups, making their applications very specific. They are mostly cationic starches which are additionally functionalised either by phosphate groups or by xanthates.

Among the esters, a distinction is made between simple starch esters and mixed starch esters, the substituent(s) of the ester possibly being different: In the ester group RCOO—, the R group may be an alkyl, aryl, alkenyl, alkaryl or aralkyl group with 1 to 20 carbon atoms, preferably 1 to 17 carbon atoms, preferably with 1 to 6 carbon atoms. These products include the derivatives acetate (prepared from vinyl acetate or acetic anhydride), propionate, butyrate, stearate, phthalate, succinate, oleate, maleate, fumarate and benzoate.

Etherifications are largely carried out by reaction with alkylene oxides (hydroxyalkylation) containing 1 to 20 carbon atoms, preferably 2 to 6 carbon atoms, in particular 2 to 4 carbon atoms, in particular by using ethylene oxide and propylene oxide. However, methyl, carboxymethyl, cyanoethyl and carbamoyl ethers may also be prepared and used. An example of carboxyalkylation is the reaction of starch with monochloroacetic acid or its salts. Furthermore, hydrophobic etherification reagents, such as glycidyl ether or epoxides, should be mentioned in particular. The alkyl chain length of the reagents mentioned is between 1-20 carbon atoms, and in addition aromatic glycidyl ethers are also possible.

Examples of derivatisation with glycidyl ethers are o-cresol glycidyl ethers, polypropylene diglycol glycidyl ethers, tert-butylphenyl glycidyl ethers, ethylhexyl glycidyl ethers, hexanediol glycidyl ethers and neodecanic acid glycidyl esters.

Another possibility of alkylation is alkylation via alkyl halides, for example via methyl chloride, dialkyl carbonates, for example dimethyl carbonate (DMC) or dialkyl sulfate, for example dimethyl sulfate.

The starches used for esterification, etherification and cross-linking, and also the chemically non-functionalised starches, may also be tempered (in slurry) or inhibited (dry or semi-dry reaction) by means of thermal-physical modifications. Starches may also be functionalised by hydrophobing reagents. Etherified hydrophobic starches are obtained if the hydrophobic reagents contain a halide, an epoxide, a glycidyl, a halohydrin, a carboxylic acid or a quaternary ammonium group as functional group. For esterified hydrophobic starches, the hydrophobic reagent usually contains an anhydride. A hydrophobing of the starch may also be achieved by mixing a starch or a starch derivative with fatty acid ester. All of the mentioned functionalisations of starch may not only be achieved by reacting native starch, but also by using degraded forms. The degradation processes may be hydrolytic (acid-catalysed), oxidative, mechanical, thermal, thermochemical or enzymatic. In this way, the starch may not only be structurally changed, but the starch products may also be made soluble or swellable in cold water.

Lastly, the starch may also be present as a graft polymer or graft copolymer, for example with products from the group of polyvinyl alcohols or polyesters.

Epoxidised plant oils: From a chemical point of view, the epoxides used in accordance with the invention are cyclic ethers. Epoxides may form interactions with the hydroxy groups of starch. Epoxides also include, inter alia, the epoxidised oils, in particular plant oils, which are used in accordance with the invention. Due to their chemical structure, epoxides are unstable, i.e. the ring structure is opened and may react with the starch or, in combination for example with water, react to form a diol. The opening of the epoxide ring may be catalysed by acids (for example carboxylic acids). Preferably, epoxidised plant oils such as soybean or linseed oil (ESBO, ELO) are used in accordance with the invention. Epoxidised linseed oil has a viscosity of approximately 900 mPas at 25° C. and an epoxide oxygen content of at least 8.5 wt. %. Epoxidised soybean oil, on the other hand, has a viscosity of approximately 300-450 mPas (also at 25° C.) and an epoxide oxygen content of 6.5-7.5 wt. %. The viscosity measurements carried out for the purpose of the present invention were each carried out in a viscometer according to EN ISO 3219.

Polyols: According to a preferred embodiment of the present invention, the mixture contains a polyol selected from the group consisting of sorbitol, erythritol, xylitol, mannitol and mixtures thereof, in a quantity of 10 to 25 wt. %. These polyols are so efficient in the TPS as plasticisers (interaction with hydroxy groups) that processing may take place in the process window (low pressure, low torque). The polyols may also be added to the TPS as a syrup (solution in water), which facilitates the mixing into the melt, resulting in a more homogeneous TPS or even more homogeneous compounds and smooth films. Furthermore, these polyols have the advantage over glycerol that they are solid at room temperature, but are present as a melt during processing and may therefore have a plasticising effect.

Preferably, the mixture as a polyol contains sorbitol or erythritol in a quantity of 10 to 15 wt. %.

It is also favourable if the mixture contains the polyol in a quantity of 13 to 15 wt. %. It has been found that the proportion of polyol as plasticiser in the TPS should not be too high, otherwise potential problems in food contact may occur. The plasticiser could, for example, leak out if it is present in excess, but on the other hand a certain percentage of plasticiser must be present in order a) to be able to process in the process window (pressure, torque) and b) ultimately to achieve the required film properties (extensibility, tensile strength).

According to further preferred embodiment of the present invention, the mixture is intended to contain epoxide to polyol in a ratio of 1:2 to 1:8, preferably 1:4 to 1:6, particularly preferably 1:5. In the range of 1:2 to 1:8, TPS processing is good (pressure, torque and cuttability of the melt for producing granules) and an increase in the bulk density is noticeable. A ratio of 1:5 ultimately fulfils all the required properties on the film, namely a tensile strength>10 MPa and an extensibility>300%.

Furthermore, it is favourable if the mixture additionally contains lactic acid in a quantity of 2 to 9, preferably 4 to 7, particularly preferably 3.5 to 4.5 wt. % of the mixture. Lactic acid favours the processability of the TPS (pressure, torque); on the other hand, due to its properties, the acid does not lead to a significant degradation of the starch, and therefore its properties are preserved. In addition, the melt is still cuttable in the concentration range mentioned.

In the method according to the invention, it is preferably provided that the mixture is extruded at a temperature of 100-175° C., preferably in a twin screw extruder and at reduced pressure in the last portion of the extruder. In the specified temperature range, the raw material is thermally stable during continuous processing, and the twin-screw extruder enables efficient destructuring of the starch (breaking up of the crystallinity of the native starch) by forced conveyance. A reduced pressure in the last portion of the extruder is important for adjusting the water content of the TPS product; this affects the processability and should be between 4-6 wt. % if possible.

The present invention also relates to a thermoplastic starch obtainable by one of the methods disclosed above, which thermoplastic starch preferably has a bulk density of 70 to 85 g/100 ml. Thus, the thermoplastic starch produced in accordance with the invention is considerably denser than a TPS produced without the use according to the invention of an epoxide together with an acid, for which purpose reference is also made to the attached FIG. 1, in which these differences are clearly visible. Determined bulk densities of thermoplastic starches produced in accordance with the invention are also shown in the attached FIG. 5.

Also provided for in accordance with the invention is a compound containing such a thermoplastic starch produced in accordance with the invention and extruded with at least one thermoplastic polymer. This enables an increase in the bio-based and biodegradable proportion, as well as the adjustment of the compound ductility by the TPS proportion. Compounds of this type may be used directly for further processing, for example in the film line.

Preferably, such a compound contains as thermoplastic polymer a polymer selected from the group comprising polyolefins, polyamides, polyurethanes, polyesters and mixtures thereof. Preferably, such a compound contains, as thermoplastic polymer, polyesters which are readily miscible with the TPS due to their viscosities. The adjustment of the compound properties, for example the strength, is possible via the polymer blend; surprisingly, with the thermoplastic starch produced in accordance with the invention, it is possible to provide a TPS content in the compound of up to 55 wt. %.

As already mentioned, the TPS produced in accordance with the invention or a compound containing such a TPS is particularly suitable for producing a film by blown film or flat film extrusion. Surprisingly, it has been found that during the production of such a film, the practically unavoidable smoking no longer occurs when using a TPS known from the prior art.

The above-mentioned mixtures with their individual components are processed into a thermoplastic melt in the extruder under temperature and shear action.

BRIEF DESCRIPTION OF DRAWINGS

FIG. 1: TPS with addition of acid and a) 0%, b) 2%, c) 4%.

FIG. 2: Polarisation for 3, 5 and 6% ELO—magnified 100 times.

FIG. 3: Polarisation for 3, 5 and 6% ESBO—magnified 100 times.

FIG. 4: Smoking behaviours of the films.

FIG. 5: Bulk density of the TPS according to the invention depending on the amount of ELO.

DETAILED DESCRIPTION

The present invention will now be explained in greater detail by means of the following examples.

TABLE 1

Material properties of film materials based on TPS and the polyester Ecoflex from BASF, DE (compounded 1:1), wherein in the case of TPS, different plasticisers were used in comparable proportions (in each case 13 wt. % of the substance listed in the table in combination with 4 wt. % solid sorbitol)

| Plasticiser | Tensile strength (MPa) | Extensibility (%) | Tear resistance (N/mm) |
|---|---|---|---|
| Glycerol | 10.5 | 540.0 | 87 |
| Xylitol | 14.1 | 155.0 | 78 |
| Sorbitol | 12.0 | 56.0 | 62 |
| Isosorbide | 9.2 | 31.0 | 59 |

Both in the comparative examples mentioned in Table 1 and in the following examples according to the invention, native starch (native maize starch, Maisita 21000) was mixed with a plasticiser (10-25 wt. %), acid (0.1-1 wt. %) and, of course only in the examples according to the invention, an epoxidised plant oil (0.1-6 wt. %) in a one-step extrusion process, broken down and plasticised. For this purpose, the TPS was produced in a twin-screw extruder with vacuum degassing; all additives are added directly to the extrusion method via appropriate metering units. Processing took place in a temperature range between 100 and 160° C. (a strong brown colouring may be seen above 160° C.).

The plasticiser may be presented in both solid and liquid form, and it is also possible to split the addition (i.e. addition partly in solid and partly in liquid form). The oil component is added untreated in liquid/pumpable form.

Table 1 above shows that the use of plasticisers other than glycerol without the addition of epoxidised plant oil leads to a deterioration of mechanical properties. The exclusive substitution of glycerol by plasticisers such as sorbitol, isosorbide or xylitol in a TPS is therefore not appropriate and, in the case of film materials based on TPS and polymer, has been shown to lead to losses in terms of the achievable mechanical material properties.

Only the addition of epoxidised plant oils (for example epoxidised linseed oil (ELO), epoxidised sunflower oil, epoxidised rapeseed oil or epoxidised soybean oil (ESBO) and mixtures thereof), as provided for in accordance with the invention, leads to the incorporation/mixing of the plasticiser in the TPS, even when sorbitol is used for example. An improvement of the phase compatibility in the compound, through the integration of the oil component in the TPS, subsequently leads to an increase in the mechanical material properties.

The activation of the epoxide functionality in the epoxidised plant oils is promoted by the addition of acids. Preferably carboxylic acids (which ideally may be produced on a sustainable basis) such as citric acid, tartaric acid, acetic acid, itaconic acid, malic acid or lactic acid are used.

Furthermore, the addition of epoxidised plant oil reduces the die pressure and thus inhibits the described expansion (see the attached drawings, from which the advantages of the method according to the invention can be clearly seen).

As a side effect of the optional acid addition, the reduction of the relative molar mass of the TPS is observed (hydrolysis), which results in easier flowability (lower viscosity) and improves processability and miscibility with the polymer. The addition of process additives to optimise processability is permitted up to a proportion of 3 wt. % (for example fatty acids such as palmitic acid, myristic acid, stearic acid or behenic acid). The starch types, by definition, may be used as starting raw materials, for example with a dry substance of ~90 wt. %.

The extrudates produced in accordance with the invention are suitable for further processing into compounds (for example in combination with polyesters). Only on the basis of the compounds is it possible to produce end products such as film materials.

In the following examples A, the production of the TPS or compound will be described first. This is followed in examples B1 to B4 by an explanation of further processing into blown films based on TPS and polyester.

Example A

Corn starch is fed into the extruder as the starting raw material by means of solids metering. Sorbitol (10-15 wt. %) is used as the plasticiser component. Stearic acid (1 wt. %) is used to improve processability (torque reduction). Acid and epoxidised plant oils include citric acid (0.1-0.5 weight %) and epoxidised oil (3, 5 and >6 weight %). The mixture is processed using a temperature profile in the range 100-130° C. and at a speed of 250 rpm in a twin-screw extruder and pelletised at the die plate by means of hot die-face pelletising. The resulting material is water-soluble and may be incorporated as finely distributed TPS (disperse phase) via a separate extrusion step, for example in polyester melts (continuous phase).

The thermoplastic starch from Example A1 is compounded together with polybutylene adipate terephthalate (PBAT) as polyester in a ratio of 1:1 in a twin screw extruder.

Suppliers:
Sorbitol, glycerol, stearic acid—Brenntag, AT
ELO, ESBO—Hobum, AT
Citric acid—Jungbunzlauer, AT Machine types:
Extrusion (TPS and Compound): Theysson TSK 30, 28D, 7 zones
Blown film line: OCS BFT400V3

TABLE 2

A1 - Influence of the added quantity of ELO for a product according to the invention with a plasticiser content of 13 wt. % (sorbitol) with 0.1 wt. % citric acid

| ELO (wt. %) | Polarisation cross | Molar mass (kDa) | Particle (μm) |
|---|---|---|---|
| 0 | 0 | 1850 | 0.8 |
| 3 | 0 | 1070 | 1.4 |
| 5 | 7 | 1270 | 5.4 |
| >6 | 8 | 1310 | 11.7 |

It is shown that the breakdown is impaired at higher ELO concentrations. At an ELO content of 6 wt. % and above, a saturation of the system was observed (oily film on the extrudates). A reduction in the shear effect due to the ELO addition increases the size of the dispersed TPS particles.

FIG. 2 shows the polarisation at 3, 5 and 6% ELO magnified 100 times.

TABLE 3

A2 - Influence of the quantity of sorbitol added for a product according to the invention with an ELO content of 3 wt. % with 0.1 wt. % citric acid

| Sorbitol (wt. %) | Polarisation cross | Molar mass (kDa) | Particle (μm) |
|---|---|---|---|
| 13 | 0 | 1070 | 1.4 |
| 14 | 0 | 1340 | 3.5 |
| 15 | 0 | 1490 | 1.4 |

An increase in the plasticiser content causes an increase in the relative molar mass.

TABLE 4

A3 - Influence of the quantity of ESBO added for a product according to the invention with a plasticiser content of 15 wt. % (sorbitol) with 0.1% citric acid

| ESBO (wt. %) | Polarisation cross | Molar mass (kDa) | Particle (μm) |
|---|---|---|---|
| 0 | 0 | 2040 | 0.5 |
| 3 | 0 | 809 | 1 |
| 5 | 0 | 832 | 1.1 |
| 6 | 0 (but spherical structures visible) | 938 | 1.5 |

In terms of the relative molecular mass, both the addition of ELO and also of ESBO results in a significant reduction at low oil concentrations. The effect decreases with increasing oil content. The TPS particle size increases with increasing oil concentration. In both cases, an oily surface of the extrudates was observed with 6 wt. % oil added. Thus, the additive could not be incorporated into the matrix—the system showed clear signs of saturation. Therefore, film processing of these TPS variants was abandoned. FIG. 3 shows the polarisation at 3, 5 and 6% ESBO magnified 100 times.

TABLE 5

A4 - Influence of the quantity of citric acid (ZS) added for a product according to the invention with a plasticiser content of 15 wt. % (sorbitol) with ELO/ESBO (3 wt. %)

| ZS (wt. %) | Polarisation cross | Molar mass (kDa) | Particle (μm) |
|---|---|---|---|
| ELO | | | |
| 0 | 2 | 1370 | 1.3 |
| 0.1 | 0 | 1490 | 1.4 |
| 0.5 | 0 | 578 | 0.9 |
| ESBO | | | |
| 0 | 2 | 798 | 1.7 |
| 0.1 | 0 | 809 | 1 |
| 0.5 | 0 | 564 | 1 |

A significant reduction in the relative molecular mass of the TPS was observed with the addition of 0.5 wt. % acid.

Example B

Based on the "A" test series, blown films were produced at a processing temperature of 170° C. During the course of this, the torque on the film extruder was recorded as an important criterion for processability.

TABLE 6

Compounding of samples A1 - ALL NON-SMOKING

| ELO (wt. %) | Torque (Nm) | Tensile strength (MPa) | Extensibility (%) |
|---|---|---|---|
| 0 | 129 | 7.4 | 87 |
| 3 | 110 | 20.8 | 210 |
| 5 | 106 | 12.8 | 246 |

In conjunction with the use of sorbitol as a plasticiser, it is noted that sorbitol does not generally smoke during blown film processing, however, sorbitol-based materials demonstrate poor mechanical material properties, although this may be significantly improved by adding ELO.

TABLE 7

Compounding of samples A2 - ALL NON-SMOKING

| Sorbitol (wt. %) | Torque (Nm) | Tensile strength (MPa) | Extensibility (%) |
|---|---|---|---|
| 13 | 110 | 20.8 | 210 |
| 14 | 107 | 15.2 | 186 |
| 15 | 114 | 14.5 | 405 |

TABLE 8

Compounding of samples A3 - ALL NON-SMOKING - 15% sorbitol

| ESBO (wt. %) | Torque (Nm) | Tensile strength (MPa) | Extensibility (%) |
|---|---|---|---|
| 0 | 138 | 12.3 | 78 |
| 3 | 129 | 11.7 | 307 |
| 5 | 120 | 10.6 | 324 |

TABLE 9

Compounding of samples A4 - ALL NON-SMOKING - 15% Sorbitol

| | Torque (Nm) | Tensile strength (MPa) | Extensibility (%) |
|---|---|---|---|
| ZS/ELO (wt. %) | | | |
| 0 | 175 | 18.8 | 250.5 |
| 0.1 | 114 | 14.5 | 405.0 |
| 0.5 | 108 | 17.2 | 220.7 |
| ZS/ESBO (wt. %) | | | |
| 0 | 154 | 13.6 | 156.0 |
| 0.1 | 129 | 11.7 | 307.0 |
| 0.5 | 116 | 18.8 | 247.1 |

Additional tests with glycerol:

TABLE 10

C1 - Influence of the quantity of ELO added for a product according to the invention with a plasticiser content of 17.0 wt. % (13.0 wt. % glycerol, solid sorbitol 4 wt. %) with 0.1 wt. % citric acid

| ELO (wt. %) | Polarisation cross | Molar mass (kDa) | Particle (μm) |
|---|---|---|---|
| 0 | 0 | 419 | 5.5 |
| 3 | 0 | 711 | 3.1 |
| 5 | 1 | 752 | 4.0 |
| 6 | 3 (but spherical structures visible) | 767 | 4.6 |

As the results of Table 8 above show, the use of glycerol does not lead to the effects described for a combination with pure sorbitol for the product according to the invention. The molar mass already assumes lower values without the addition of ELO. The fineness of the dispersion of the TPS in the polyester matrix is hardly influenced by ELO. The saturation of the system is again also shown by an oily surface of the extrudates with an ELO addition of 6 wt. %.

TABLE 11

Compounding of samples C1 - ALL SMOKING

| ELO (wt. %) | Torque (Nm) | Tensile strength (MPa) | Extensibility (%) |
|---|---|---|---|
| 0 | 97 | 10.5 | 540.0 |
| 3 | 91 | 9.1 | 411.7 |
| 5 | 89 | 9.8 | 410.1 |

TPS based on glycerol shows a strong smoking effect during blown film processing despite the addition of ELO.

Furthermore, no improvement in material strength was discernible after ELO addition. On the other hand, the extensibility of manufactured films assumed very high values already without ELO.

Analysis methods: Checking the starch breakdown of the TPS (aim: transfer of the granular starch into a homogeneous melt): If an unground sample is available, it must first be ground as finely as possible using a laboratory mill. It is also important to ensure that samples that have already been ground should not be left to stand for too long, as they will quickly attract moisture and thus falsify the result of the dry substance. The dry substance is then determined. Then, the ground TPS is stirred 5.0 wt. % into dry substance. The demineralised water is placed in the beaker and the sample is carefully sprinkled in while stirring. The total weight (sample+demineralised water) is 200 g.

Shearing parameters: 5 minutes at 1000 rpm with a 4 cm toothed disc stirrer.

For analysis, two drops of the well-slurried sample are now applied to a microscope slide by means of a Pasteur pipette and examined under a transmitted light microscope with and without polarisation filter.

Determination of the relative molecular mass by gel permeation chromatography: In the case of starches soluble in cold water, the water is provided and the starch stirred in. 0.75 g starch in dry substance (note exact weight) is stirred into approximately 30 ml ultrapure water. Only when the starch is completely swollen (dissolved) can the process proceed. Next, the pH value is adjusted to pH 7±0.5 using hydrochloric acid (0.1 N/1 N) or NaOH solution (0.1 N/1 N). The neutralised solution is then transferred quantitatively into a 100 ml volumetric flask and made up to the mark with ultrapure water. Subsequently, 2 ml of each sample is placed in a 15 ml Supelco tube; 3 ml DMSO and a magnetic stirring rod are added, and the mixture is heated to approximately 100-105° C. for 60 minutes and then cooled to RT with stirring. After cooling, approximately 1 ml of the samples are filtered through a 1 μm Puradisc 25GD Disposable Filter from Whatman (glass fibre filter) into a 1.5 ml analysis tube and sealed tightly. The solution must be thin, clear and homogeneous, i.e. no "clusters" should be visible. Samples that are still turbid after filtration or that are extremely difficult to filter may be centrifuged for 10 minutes at 13,000 rpm in an Eppendorf centrifuge.

Incorporation of the TPS into the polymer matrix: Some granules of the compound to be examined are briefly dipped in liquid nitrogen, folded in baking paper and carefully broken into fragments with a hammer. The granule fractions are transferred to a glass beaker, coated with 1 M HCL, and stirred for 3 hours on a magnetic stirrer. Hydrochloric acid is then separated out through a folded filter, and the compounds released from starch are rinsed 2-3 times with demineralised water before drying. The moist compound fractions are scattered onto a petri dish and dried in a drying cabinet at 60° C. for one hour. The dried cryogenic fractions may now be examined by electron microscope.

Evaluation of the smoking behaviour: Optical: The evaluation with regard to smoking/non-smoking may be carried out on the blown film line according to FIG. 4 by means of optical inspection. In the case of the evaluation with "smoking", the development of "wafts of mist" could be seen on the film tube (see FIG. 4). Analytical: The finely ground sample is analysed with regard to the smoking behaviour by means of gas chromatography (headspace technique). During the course of the analysis, the sample is successively heated in and beyond the processing area. The smoking behaviour is evaluated qualitatively and quantitatively by means of mass spectrometry. If a loss of mass of >20 μg/mg sample is detectable after a measuring time of 5 minutes, the evaluation of "smoking" is given.

Determination of the mechanical material properties: According to EN ISO 527-1/-2

Determination of the bulk density: "loose bulk density", determined by loose filling of a 100 ml measuring cylinder Specification window: 70-85 g/100 ml Starch breakdown: <10 polarisation crosses (preferably no polarisation crosses visible)

Molar mass TPS: Mw=500-2000 kDa (preferably between 900 and 1600, better still between 1000 and 1500)

Dispersion in the compound: preferably <5 μm (<20 μm—film-compatible but poor haptics, <10 μm—film-compatible but micro-roughness present).

The superior material properties of films produced from TPS or compound produced in accordance with the invention are demonstrated by an extensibility: >300% at a tensile strength of >10 MPa—A TPS content of 50 wt. % and above may be used (a TPS content of 50 wt. % was used for the tests).

The invention claimed is:

1. A method for producing a thermoplastic starch, the method comprising extruding a mixture including:
   starch,
   a polyol in a quantity of between 10 and 25 wt. % of the mixture,
   an epoxidized plant oil selected from a group consisting of soybean oil, linseed oil, sunflower oil, rapeseed oil and mixtures thereof, in a quantity of between 0.1 and 6 wt. % of the mixture, and
   a carboxylic acid selected from a group consisting of citric acid, malic acid and tartaric acid in a quantity of between 0.1 and 1 wt. % of the mixture.

2. The method according to claim 1, wherein the polyol is one selected from a group consisting of polyethylene glycol, monosaccharides, sugar alcohols and mixtures thereof.

3. The method according to claim 1, wherein the quantity of the epoxidized plant oil in the mixture is between 1 and 4.5 wt. %.

4. The method according to claim 1, wherein the quantity of the carboxylic acid in the mixture is between 0.1 and 0.5 wt. %.

5. The method according to claim 1, wherein the polyol is one selected from a group consisting of sorbitol, erythritol, xylitol, mannitol and mixtures thereof, and the quantity of the polyol in the mixture is between 10 to 15 wt. %.

6. The method according to claim 5, wherein the polyol is one selected from a group consisting of sorbitol and erythritol, and the quantity of the polyol in the mixture is between 10 to 15 wt. %.

7. The method according to claim 1, wherein the quantity of the polyol is between 13 to 15 wt. %.

8. The method according to claim 1, wherein the mixture has an epoxide to polyol ratio of between 1:2 to 1:8.

9. The method according to claim 1, wherein the mixture further includes additional lactic acid.

10. The method according to claim 1, wherein the mixture is extruded at a temperature of 100 to 175° C.

11. A thermoplastic starch obtainable by a method according to claim 1.

12. The thermoplastic starch according to claim 11, which has a bulk density of 70 to 85 g/100 ml.

13. A compound containing the thermoplastic starch according to claim 11, extruded with at least one thermoplastic polymer.

14. The compound according to claim 13, wherein the thermoplastic polymer is one selected from a group consisting of polyolefins, polyamides, polyurethanes, polyesters and mixtures thereof.

15. A film produced by at least one of blown extrusion and flat film extrusion of the compound according to claim 13.

16. The method according to claim 10, wherein the extruding occurs in a twin-screw extruder with a separate vacuum zone in which degassing takes place by application of a vacuum.

17. The method according to claim 9, wherein the quantity of the epoxidized plant oil in the mixture is between 2.5 and 3.5 wt. %.

* * * * *